Feb. 17, 1970    H. B. H. COOPER    3,495,938
ALKALI METAL HYDRIDE PRODUCT AND PROCESS FOR ITS MANUFACTURE
Filed June 27, 1967
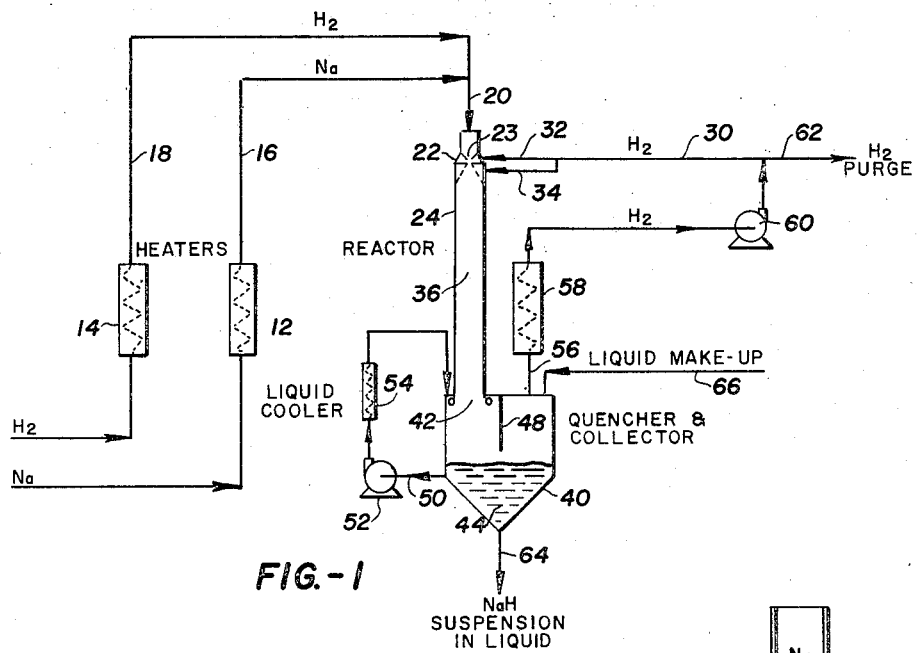
FIG.-1
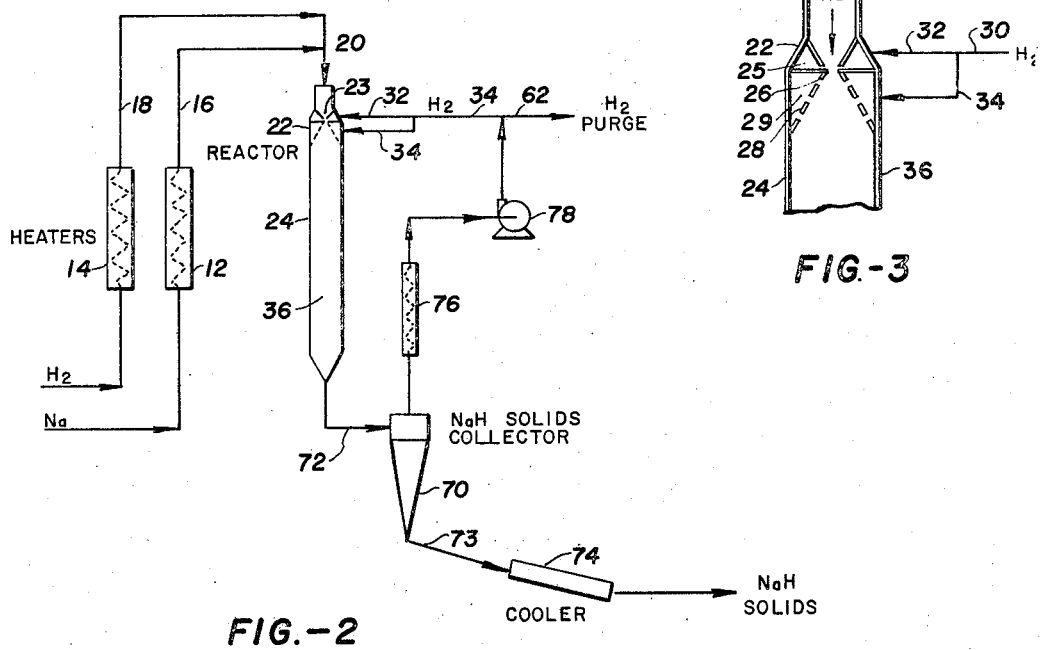
FIG.-2
FIG.-3
INVENTOR.
HAL B. H. COOPER
BY ERIC P. SCHELLIN
ATTORNEY United States Patent Office
3,495,938
Patented Feb. 17, 1970

3,495,938
ALKALI METAL HYDRIDE PRODUCT AND
PROCESS FOR ITS MANUFACTURE
Hal B. H. Cooper, 4234 Chevy Chase Drive,
Pasadena, Calif. 91103
Filed June 27, 1967, Ser. No. 649,316
Int. Cl. C01b 6/04; B01j 1/14
U.S. Cl. 23—204
14 Claims

ABSTRACT OF THE DISCLOSURE

A highly reactive alkali metal hydride and process for its manufacture involving precipitously cooling an alkali metal vapor, for example, sodium vapor, with a hydrogen gas stream to a temperature at which the alkali metal and hydrogen react to form the desired alkali metal hydride products.

BACKGROUND OF THE INVENTION

This invention relates to a highly reactive alkali metal hydride product and process for its manufacture.

It is known in the prior art that alkali metal hydrides may be prepared by passage of hydrogen over heated molten alkali metal followed by electrical condensation of the resulting alkali metal smoke. The process is inefficient and has not found widespread commercial application. A commercially applied batch process for the production of alkali metal hydrides, and in particular sodium hydride, involves dispersing liquid metallic sodium in a hydrocarbon, such as kerosene, and hydrogenating it under high hydrogen pressure accompanied by vigorous agitation, the agitation serving to continuously expose fresh metallic sodium to the hydrogen so that the reaction may proceed. Without the violent agitation a sodium hydride coating would form over the surface of the individual metallic sodium particles, occluding the unreacted sodium and thus protecting it from further hydrogenation. A process of this general type is described in U.S. Patent 1,958,012 Muchenfuss. It will be appreciated that sodium hydride or other alkali metal hydride product produced through the hydrocarbon dispersion method is necessarily contaminated with hydrocarbon which is objectionable in those applications where the hydrocarbon interferes with a further reaction or use. The particle size of the sodium hydride or other alkali metal hydride of the hydrocarbon dispersion approach is typically in the range of 5 to 50 microns, or larger. A commercially available sodium hydride of such particle size range is supplied in the form of 55% sodium hydride-oil dispersion which has the appearance of a grey powder slightly moistened with oil. The sodium-oil dispersion may be diluted and dispersed in additional mineral oil or mixed with other carriers to provide a pumpable concentration. Sodium hydride is soluble in very few commercially used solvents with which it does not react, and for this reason it is important to have an extremely small particle size in order for reactions to proceed efficiently.

SUMMARY OF THE INVENTION

It is a principle object of the invention to provide an improved alkali metal hydride product characterized by exceptionally small particle size and high reactivity.

It is a further object of the invention to provide a continuous process for the production of sodium hydride.

It is a still further object of the invention to provide a process for the production of oil-free alkali metal hydrides.

The alkali metal hydride product of the invention characteristically has a particle size several magnitudes smaller than hydride particles produced by the prior art. Typically, the average particle size is less than one micron. The alkali metal hydride product of the invention, because of its small particle size, is highly reactive and being free of oil may be employed directly in applications precluded to the oil contaminated hydride of the prior art. In the prior art further and costly processing is required to free the particles of oil.

The process of the invention involves turbulently mixing an alkali metal vapor with a cooler hydrogen gas stream and precipitously cooling to a temperature where the alkali metal and hydrogen react to form the alkali metal hydride, and thereafter separating the unreacted hydrogen. The alkali metal hydride product may be separated as a dry powder from the process hydrogen gas or alternatively the hydride can be collected as a suspension in a liquid and thus separated from the unreacted hydrogen.

In a preferred embodiment of this process the alkali metal vapor is delivered in a gas stream diluted with heated hydrogen to the precipitous cooling step with the heated hydrogen being present in the stream in a stoichiometric equivalent, or excess of that required for the hydride reaction, typically, the hydrogen will be provided in an amount up to 50% stoichiometric excess.

The absorption of hydrogen by sodium metal begins at about 200° C. and is quite rapid at temperatures of 300 to 400° C. At temperatures above about 400–450° C. the sodium hydride dissociates into hydrogen and elemental sodium and as a result, sodium hydride cannot be melted at atmospheric pressure. Metallic sodium boils at about 880° C. The foregoing physical properties of sodium and generally similar properties of the other alkali metals control in a large part the conditions surrounding the process of the invention. Generally, the alkali metal is cooled to a temperature less than about 450° C., usually in the range of 100° C. to 400° C.

Where the alkali metal hydride product being produced is sodium hydride, sodium vapor is precipitously cooled from a temperature in excess of its boiling point, that is, in excess of about 880° C., to a hydride reaction temperature generally less than 450° C. and preferably to a temperature in the range of 100 to 400° C. The rapid mixing and cooling of the metallic sodium vapor from the elevated temperature to the considerably lower hydride reaction temperature substantially forestalls condensation and formation of droplets of the sodium. In the preferred embodiment, the hydrogen present in the hot alkali metal vapor stream supplied to the precipitous cooling step provides further safeguard against coalescing of metallic sodium. It is indicated that to the extent coalescence may occur, formation of a hydride coating about unreacted alkali metal will follow. It is important that the reaction between the hydrogen and alkali vapor occur before significant condensation and coalescence of the alkali metal occurs. It is desirable that the cooling be accomplished in less than about 10 seconds and preferably in less than one second. The hydrogen employed for the precipitous cooling is generally initially at a temperature less than about 100° C. and in excess of about −250° C., and preferably in the range of −100° C. to 100° C. The cooling hydrogen is typically provided in an amount in excess of 10 moles per mole of the alkali metal vapor, preferably in an amount within the range of 10 to 100 moles per mole of the alkali metal vapor.

The desired conditions surrounding the manufacture of the other alkali metal hydrides will vary somewhat from that of sodium. For example, the potassium vapor about 670° C. to a temperature of less than about 450° C. while the lithium vapor is cooled from a temperature in excess of about 1330° C. to a temperature less than 450°

C. Similarly, rubidium vapor will be precipitously cooled from a temperature in excess of about 700° C. to a reaction temperature less than 450° C. and cesium vapor is precipitously cooled from a temperature in excess of about 670° C. to a temperature of less than about 450° C.

It is indicated that there is some reaction between the alkali metal and the hydrogen at temperatures above the temperatures commonly given for the decomposition of the corresponding hydride. It is apparent that with an increase in pressure or increase in partial pressure of the hydrogen, and a correspondingly higher ratio of hydrogen to alkali metal, the likelihood of hydride formation increases.

DESCRIPTION OF THE DRAWING

FIGURE 1 is a flow sheet of the process of the invention for producing a liquid suspension of sodium hydride or other alkali metal hydride;

FIGURE 2 is a flow sheet of the process of the invention adapted to the production of a dry, powder alkali metal hydride; and FIGURE 3 is a fragmentary, schematic illustration of a mixing zone for turbulently mixing the alkali metal vapor and cooling hydrogen stream.

DESCRIPTION OF THE PREFERRED EMBODIMENT

For illustrative purposes, the process of the invention will be described for the production of sodium hydride. It will be appreciated that the system illustrated with suitable adjustments of conditions may be utilized for the production of other alkali metal hydrides.

Liquid sodium is passed to a heat exchanger 12 where the sodium is vaporized and heated to a temperature of about 900° C. Hydrogen in approximately a 10 percent stoichiometric excess is supplied to a second heat exchanger 14 and there heated to a temperature of about 900° C. The heated sodium and hydrogen are delivered respectively through lines 16 and 18 to a common line 20 where they are mixed, which latter line opens into a turbulent mixing zone 22 of a reactor 24. The details of the mixing zone 22 are more clearly illustrated in the enlarged FIGURE 3, where it is seen that the mixing zone 22 generally centrally of its length has a necked-down section 23 which aids in obtaining a region of high turbulence with the cooling hydrogen. The sodium-containing stream is supplied centrally to the mixing zone 22 with a cooling hydrogen stream being introduced generally laterally at high velocity into the sodium stream through a narrow annular slit 26 located in the necked down section 23. The cooling hydrogen is supplied to an outer annular zone 25, being preferably introduced therein in a tangential direction so as to create a spiralling stream which upon passage through the slit 26 turbulently mixes with the sodium vapor. It is desirable that the laterally-introduced hydrogen be supplied to a relatively high velocity to achieve rapid mixing as the hydrogen stream knifes across the sodium stream. The high velocity and whirling motion of the hydrogen effects a substantially uniform instantaneous mixing of the two streams, thus bringing about the desired precipitous cooling of the sodium vapor. Other mixing zone designs and configurations may be used to accomplish the turbulent mixing and precipitous cooling.

The turbulent mixing zone 22 downstream of the slit 26 is provided with an outwardly flaring conical wall 28 which may, for example, be either a foraminous or porous structure. The foraminous cone structure is provided with a plurality of discrete openings. The alternative porous wall structure may be formed of sintered metal particles. The conical porous or foraminous wall defines the inner wall of a second annulus compartment 29 into which there is introduced a further quantity of the cooling hydrogen.

Typically, a hydrogen stream 30 is divided into a larger stream 32 and a smaller stream 34 which are introduced respectively into the first annulus compartment 25 and second annulus compartment 29. The smaller hydrogen stream 34 which typically may comprise about 10 percent of the total hydrogen in passing through the porous conical wall 28 minimizes the deposition of unreacted sodium metal or sodium metal on the reactor surface downstream of the mixing zone. In another embodiment the secondary hydrogen stream 34 may be introduced in a tangential manner through vertical slots located in the conical wall 28 to set up a whirling protective sheath of hydrogen gas. The hydrogen-sodium stream from the turbulent mixing zone 22 enters an elongated retention zone 36 of the reactor 24. The length of the retention zone is such as to assure substantially complete reaction of the sodium with hydrogen prior to passage of the gas stream to the sodium hydride recovery. While the system may be operated at an elevated pressure, it will normally be slightly above atmospheric. The hydrogen employed for the precipitous cooling is generally initially at a temperature less than 100° C., and in this illustrative embodiment a temperature in the range of about 20°–50° C. is employed, although lower temperature hydrogen may be used. The cooling hydrogen is typically provided in an amount in excess of 10 moles per mole of the alkali metal vapor, and preferably in an amount within the range of 10 to 100 moles per mole of the alkali metal vapor.

From the reaction zone 36, the gaseous stream now containing sodium hydride is passed to a recovery system which in the instance of FIGURE 1 is a wet collection system, and in the case of the system of FIGURE 2 a dry collection system.

Referring to FIGURE 1, the wet collection system comprises a combined quencher-collector 40 having a gas stream entry port 42 on the top side thereof. The quencher-collector 40 contains a large pool 44 of the collecting liquid medium. In the particular embodiment illustrated in FIGURE 1, the collecting liquid medium is easily brought into contact with the relatively hot gas stream through a spray provided by a spray ring 46 disposed about the gas entry 42. The spray ring 46 provides a high velocity downwardly and inwardly converging spray cone through which the gas stream passes. A baffle arrangement 48 within the quencher-collector 40 promotes liquid-gas contact and insures downward flow. Liquid is supplied to the spray ring 46 through a liquid withdrawal line 50 opening into the pool 44, a pump 52 and a liquid cooler 54. The excess hydrogen gas stream is removed from the quencher-collector 40 through a line 56 to a condenser 58 which condenser serves to further cool the hydrogen stream and to knock back or condense any liquid medium that may have carried over in the exiting hydrogen stream. The cooled hydrogen gas from the condenser and cooler 58 is passed to recycle line 30 through a compressor 60. Excess or bleed hydrogen may be purged from the system through a line 62. The sodium hydride liquid slurry is withdrawn from the quencher-collector 40 via a line 64 with make-up liquid being supplied through line 66 to the collector.

Alternatively to the spray type quenching system illustrated, a splash collector provided with an agitator which throws large quantities of the liquid medium into the incoming product stream may be used to cool and recover the sodium hydride. If desired, such an agitator may be used in combination with the system illustrated FIGURE 1, and in such application the agitator is disposed to throw large quantities of the liquid medium into the incoming sodium hydride-hydrogen stream.

Sodium hydride is substantially insoluble in most commercially useful unreactive or inert solvents. The liquid medium washes the sodium hydride dust from the hydrogen stream, thereby forming a hydride containing slurry. Various liquids may be employed in the quencher-collector 40, such as hydrocarbons of suitable volatility, for example, kerosene and adjacent petroleum fractions. One desirable fraction has a boiling range of about 300° C. to 450° C. Where it is desired to produce a non-oil contaminated hydride, other liquids may be utilized in quencher-collector 40, such as simple ethers, for example, diethyl, dipropyl, and dibutyl ether. Mixed ethers may be utilized, for example, methyl-ethyl, ethyl-propyl, etc. ethers. Other liquids that may be utilized in the collector for the hydride slurry include tetrahydrofuran, dioxane, and the dimethyl ether of ethylene glycol (monoglyme) and its higher homologues, such as diglyme, triglyme and tetraglyme. Various amines may be employed including triethyl, tripropyl, and tributyl amines, as well as more complex structures such as morpholine.

There is illustrated in FIGURE 2 a dry collection system made up of a cyclone collector 70 which follows the retention zone 36 of the reactor 24 through a line 72. The solid sodium hydride recovered in the cyclone 70 is transferred through a line 73 to a rotary cooler 74. The hydrogen stream from the cyclone 70 passes through a cooler 76 and thence to a compressor 78 from where it is returned to the recycle line 30.

While there has been disclosed above preferred embodiments to the process of the invention, it will be appreciated that other embodiments are possible without departing from the inventive concept herein disclosed.

What is claimed is:

1. An improved process for producing an alkali metal hydride product, the process comprising:

separately providing a high temperature first stream of an alkali metal vapor and a lower temperature second stream of hydrogen gas, said first stream being at a temperature in excess of the boiling point of the alkali metal with said second stream being at a temperature which provides upon mixing of the two streams a mixture temperature at which the alkali metal hydride product is stable;

turbulently mixing the alkali metal vapor first stream with the hydrogen gas second stream to precipitously cool the vapor whereby the vapor is cooled in less than about 10 seconds to a temperature where the alkali metal and hydrogen react to form the alkali metal hydride product; and separating unreacted hydrogen from the alkali metal hydride product.

2. A process in accordance with claim 1 wherein the alkali metal hydride product is separated as a dry powder from the excess hydrogen gas.

3. A process in accordance with claim 1 wherein the alkali metal hydride product is separated in a liquid from the unreacted hydrogen.

4. A process in accordance with claim 1 wherein the alkali metal vapor first stream contains a small amount of hydrogen, said hydrogen being present in an amount in excess of that required for the hydride reaction.

5. A process in accordance with claim 1 wherein the alkali metal is sodium and the sodium vapor is precipitously cooled from a temperature in excess of about 880° C. to a temperature of less than about 450° C.

6. A process in accordance with claim 1 wherein the alkali metal is lithium and the lithium vapor is precipitously cooled from a temperature in excess of about 1330° C. to a temperature of less than about 450° C.

7. A process in accordance with claim 1 wherein the alkali metal is potassium and the potassium vapor is precipitously cooled from a temperature in excess of about 750° C. to a temperature of less than about 450° C.

8. A process in accordance with claim 1 wherein the alkali metal is rubidium and the rubidium vapor is precipitously cooled from a temperature in excess of about 700° C. to a temperature of less than about 450° C.

9. A process in accordance with claim 1 wherein the alkali metal is cesium and the cesium vapor is precipitously cooled from a temperature in excess of about 670° C. to a temperature of less than about 450° C.

10. A process in accordance with claim 1 wherein the hydrogen has an initial temperature in the range of about −250° C. to 100° C.

11. A process in accordance with claim 1 wherein the sodium vapor is cooled with the hydrogen gas to a temperature within the range of 100 to 400° C.

12. A process in accordance with claim 1 wherein one mole of the alkali metal vapor is precipitously cooled with at least 10 moles of hydrogen, said hydrogen having an initial temperature in the range of −100° C. to 100° C.

13. A process in accordance with claim 12 wherein one hydrogen is supplied in an amount within the range of 10 to 100 moles per mole of the alkali metal vapor.

14. A process in accordance with claim 1 wherein the alkali metal is precipitously cooled from a temperature in excess of its boiling point to a temperature less than 450° C.

References Cited

UNITED STATES PATENTS

| | | | |
|---|---|---|---|
| 2,313,028 | 3/1943 | Siegmann | 23—204 X |
| 2,884,311 | 4/1959 | Huff | 23—204 |

OSCAR R. VERTIZ, Primary Examiner

G. D. PETERS, Assistant Examiner